United States Patent
Ko et al.

(10) Patent No.: US 12,546,849 B2
(45) Date of Patent: Feb. 10, 2026

(54) SYSTEM AND METHOD FOR WIRELESS POSITIONING

(71) Applicant: AJOU UNIVERSITY INDUSTRY-ACADEMIC COOPERATION FOUNDATION, Suwon-si (KR)

(72) Inventors: Young-Bae Ko, Suwon-si (KR); Ji Woong Park, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 313 days.

(21) Appl. No.: 18/224,242

(22) Filed: Jul. 20, 2023

(65) Prior Publication Data

US 2024/0027571 A1 Jan. 25, 2024

(30) Foreign Application Priority Data

Jul. 20, 2022 (KR) .......................... 10-2022-0089467

(51) Int. Cl.
*G01S 5/14* (2006.01)

(52) U.S. Cl.
CPC .............. *G01S 5/14* (2013.01); *G01S 2205/02* (2020.05)

(58) Field of Classification Search
CPC ...... G01S 5/14; G01S 2205/02; G01S 5/0205; G01S 1/68; G01S 11/02; G01S 5/0278;

(Continued)

(56) References Cited

U.S. PATENT DOCUMENTS

2023/0176174 A1* 6/2023 Penna ...................... H01Q 3/46
 342/451
2023/0350002 A1* 11/2023 Hirzallah .............. G01S 5/0236

(Continued)

OTHER PUBLICATIONS

Extended European Search Report issued in corresponding European Patent Application No. EP 23186638.5 dated Dec. 14, 2023 (14 pages).

(Continued)

*Primary Examiner* — Dhaval V Patel
(74) *Attorney, Agent, or Firm* — Osha Bergman Watanabe & Burton LLP

(57) ABSTRACT

The present disclosure provides a system for wireless positioning system including a collection unit for collecting a plurality of CIR data and distance data between a plurality of anchor terminals and the mobile terminal, when the mobile terminal communicates with the plurality of anchor terminals installed in a space for performing positioning of the mobile terminal; a pre-processing unit for generating a plurality of pre-proceed data by pre-processing the plurality of CIR data; a first learning unit for learning a first artificial neural network based on the plurality of pre-processed data and the distance data; an analysis unit for analyzing the first artificial neural network to select a plurality of positioning critical data used for positioning of the mobile terminal among the plurality of pre-processed data; and a second learning unit for learning a second artificial neural network based on the plurality of positioning critical data and the distance data.

11 Claims, 7 Drawing Sheets

(58) Field of Classification Search
CPC ...... G06N 3/082; G06N 3/045; G06N 3/0455; G06N 3/0495; H04W 64/00
See application file for complete search history.

(56) References Cited

U.S. PATENT DOCUMENTS

2024/0295625 A1* 9/2024 Hasegawa ............. G01S 5/0263
2024/0340844 A1* 10/2024 Fang ......................... G01S 5/26
2024/0397468 A1* 11/2024 Barbu ..................... G06N 3/045

OTHER PUBLICATIONS

Simone Angarano et al: "Robust Ultra-wideband Range Error Mitigation with Deep Learning at the Edge",arxiv.org, Cornell University Library, 201 Olin Library Cornell University Ithaca, NY 14853, Nov. 30, 2020 (Nov. 30, 2020), XP081824780 (12 pages).

Fontaine Jaron et al: "Edge Inference for UWB Ranging Error Correction Using Autoencoders", IEEE Access, IEEE, USA, vol. 8, Jul. 28, 2020 (Jul. 28, 2020), pp. 139143-139155, XP011802870, DOI: 10.1109/ACCESS.2020.3012822 [retrieved on Aug. 5, 2020] (13 pages).

Intel Corporation: "Use-cases and specification for positioning", 3GPP Draft; R1-2204798, 3rd Generation Partnership Project (3GPP), Mobile Competence Centre ; 650, Route Des Lucioles ; F-06921 Sophia-Antipolis Cedex ; France vol. RAN WG1,No. e-Meeting; May 9, 2022-May 20, 2022 Apr. 30, 2022 (Apr. 30, 2022), XP052144059, Retrieved from the Internet: URL:https://ftp.3gpp.org/tsg_ran/WG 1 _RL1/TSGR1_109-e/Docs/ R1-2204798.zip R1-2204798.docx[retrieved on Apr. 30, 2022] (21 pages).

Arne Niitsoo et al "A Deep Learning Approach to Position Estimation from Channel Impulse Responses", Sensors, vol. 19, No. 5, Mar. 2, 2019 (Mar. 2, 2019), p. 1064, XP055694905, DOI: 10.3390/s19051064 (23 pages).

* cited by examiner

SYSTEM AND METHOD FOR WIRELESS POSITIONING

CROSS-REFERENCE TO RELATED APPLICATION

This application claims priority to and the benefit of Korean Patent Application No. 10-2022-0089467, filed on Jul. 20, 2022, the disclosure of which is incorporated herein by reference in its entirety.

BACKGROUND

1. Field of the Invention

The present disclosure relates to a system and for wireless positioning and a method thereof. More particularly, the present disclosure relates to an indoor wireless positioning system and method capable being lightweight while minimizing positioning errors using Artificial Neural Networks (ANN) and Explainable Artificial Intelligence (XAI).

2. Discussion of Related Art

The wireless positioning technology is a technology for estimating a position of a mobile terminal using characteristics of a radio signal measured through wireless communication. That is, the wireless positioning technology is a technology for estimating a location of a mobile terminal by processing a radio signal transmitted from a plurality of anchor terminals installed in a fixed location and having location information known in advance.

This wireless positioning technology performs ranging by measuring Time of Flight (ToF). In more detail, messages are exchanged between anchors and tags through wireless communication, time is measured, and distances are estimated using a speed of light. At this time, since light travels at a speed of about 300,000 km/s, a time measurement error of 1 ns represents a distance error of about 30 cm. Therefore, measuring accurate time has a great correlation with accuracy of distance measurement.

The conventional wireless positioning technology measures time using channel impulse response (CIR) data collected during wireless communication.

FIG. 1 is a graph showing CIR data. Referring to FIG. 1, the CIR data represents an intensity waveform of a signal measured in nanoseconds, and is composed of hundreds of peaks.

The conventional wireless positioning technology uses a first peak algorithm for accurate time measurement. The first peak algorithm is an algorithm for measuring time of a first peak exceeding a predetermined threshold value as shown in FIG. 1, and is designed based on an assumption that the first received peak is a peak of a straight-line signal.

FIG. 2 is a diagram showing an example of a propagation process of a radio signal in a wireless positioning technology.

Referring to FIG. 2, the radio signals are reflected on surrounding structures and the signals propagate through a multipath. The CIR has multiple peaks due to the signals propagated through the multipath. Referring to the peaks of FIGS. 1 and 2, an example of a state in which the signals transmitted through the multipath appear in the CIR data may be seen. If the time of peak 2 in FIG. 1 is measured, the distance of a path corresponding to peak 2 in FIG. 2 is measured, and thus a distance measurement error occurs.

The conventional first peak algorithm has a simple advantage, but has a disadvantage in that the distance measurement error occurs significantly in a non-line-of-sight (NLOS) environment where multipath occur due to many surrounding structures or where signal propagation is disturbed by an obstacles. In particular, since ultra-wideband (UWB) is widely used for indoor positioning, such error problems often occur.

Recently, research on techniques for selecting peaks by learning CIR data using deep learning technology has been introduced to solve these problems. An artificial neural network learns the CIR data to infer a radio environment of a wireless channel, and thus selects a peak of the shortest path.

The deep learning-based wireless positioning technology has greatly improved accuracy of distance measurement compared to the conventional technology, but there is a problem that a large amount of computation is required to learn and operate an artificial neural network. In general, since a device using the wireless positioning technology is a low-power mobile device operated by a battery, it is difficult to operate the deep learning technique in real time. In addition, there is a problem of low reliability because the causal relationship between the generated learning model and the accuracy result is unclear like a black box.

SUMMARY OF THE INVENTION

An object of the present disclosure is to provide a system and method wireless positioning that can easily lightweight a neural network used for wireless positioning.

Further, an object of the present disclosure is to provide a system and method wireless positioning capable of lightweight positioning while showing high accuracy.

Further, an object of the present disclosure is to provide a system and method wireless positioning capable of minimizing a minimum required computing capability of a mobile terminal for positioning and capable of significantly reducing costs.

The technical problems to be achieved in the present disclosure are not limited to the technical problems mentioned above, and other technical problems not mentioned can be clearly understood by a person with ordinary skills in the art to which the present disclosure belongs from the following description.

To solve the problem, the present disclosure provides a system wireless positioning including a collection unit for collecting a plurality of CIR data and distance data between a plurality of anchor terminals and the mobile terminal, when the mobile terminal communicates with the plurality of anchor terminals installed in a space for performing positioning of the mobile terminal; a pre-processing unit for generating a plurality of pre-proceed data by pre-processing the plurality of CIR data; a first learning unit for learning a first artificial neural network based on the plurality of pre-processed data and the distance data; an analysis unit for analyzing the first artificial neural network to select a plurality of positioning critical data used for positioning of the mobile terminal among the plurality of pre-processed data; and a second learning unit for learning a second artificial neural network based on the plurality of positioning critical data and the distance data.

In this case, the plurality of pre-processed data may consist of a plurality of pixels in the form of a two-dimensional image representing a relationship between a plurality of peaks of the CIR data.

In addition, the analysis unit may remove a connection between any neural network nodes in the first artificial neural network to construct a plurality of third artificial neural networks having accuracy higher than or equal to a reference value.

In addition, the analysis unit may input the plurality of pre-processed data to a plurality of third artificial neural networks to select pre-processed data outputting the same distance data in a third artificial neural network having the same number or more than a reference number among the plurality of third artificial neural networks as selection data.

In addition, the analysis unit may evaluate importance of each of the plurality of pixels of the pre-processed data to select the plurality of positioning critical data consisting of the plurality of pixels having an importance higher than or equal to a reference value.

In addition, the system for wireless positioning of the present disclosure may further include a third learning unit for learning an auto-encoder based on the plurality of pre-processed data and the positioning critical data.

In this time, the auto-encoder may output the positioning critical data when the pre-processed data is input.

Further, the position information of the mobile terminal may be computed using the position information of the anchor terminal and a communication distances between the mobile terminal and the anchor terminal.

In addition, the mobile terminal may be equipped with the pre-processing unit, the automatic encoder, and the second artificial neural network to perform positioning of the mobile terminal.

In addition, the mobile terminal may pre-process the CIR data to generate the pre-processed data through the pre-processing unit, input the pre-processed data to the auto-encoder to output the positioning critical data, and input the positioning critical data to the second artificial neural network to perform positioning of the mobile terminal.

The present disclosure also provides a method for wireless positioning including: collecting a plurality of CIR data and distance data between a plurality of anchor terminals and the mobile terminal when the mobile terminal communicates with the plurality of anchor terminals installed in a space for performing positioning of the mobile terminal, pre-processing the plurality of CIR data to generate a plurality of pre-processed data, learning a first artificial neural network based on the plurality of pre-processed data and the distance data, analyzing the first artificial neural network to select a plurality of positioning critical data used for positioning of the mobile terminal among the plurality of pre-processed data, learning an auto-encoder based on the plurality of preprocessed data and the positioning critical data, and learning the second artificial neural network based on the plurality of positioning critical data and the distance data.

In addition, the method wireless positioning of the present disclosure may further include: after the learning the second artificial neural network, generating, with the mobile terminal, the pre-processed data by pre-processing the CIR data through the pre-processing unit, outputting, with the mobile terminal, the positioning critical data by inputting the pre-processed data to the automatic encoder, and performing positioning of the mobile terminal by inputting the positioning critical data to the second artificial neural network.

According to the present disclosure, the system for wireless positioning can analyze a complex neural network using an explainable artificial intelligence technology (XAI) to extract main positioning critical data within a few tens, and may simply lighten the neural network using the extracted positioning critical data.

Further, according to the present disclosure, the system for wireless positioning can have higher accuracy than conventional complex machine learning-based positioning technologies, and can perform significantly lightened positioning than conventional methods, and can rapidly and conveniently find key positioning characteristic data in a new environment.

Further, according to the present disclosure, the system for wireless positioning may minimize a minimum required computing capability of a mobile terminal for positioning, thereby expecting a significant cost reduction effect.

The present disclosure is not limited to the above-described advantages, and other advantages of the present disclosure will be clearly understood by those skilled in the art from the following description.

DETAILED DESCRIPTION OF THE EMBODIMENTS

Figure 1:
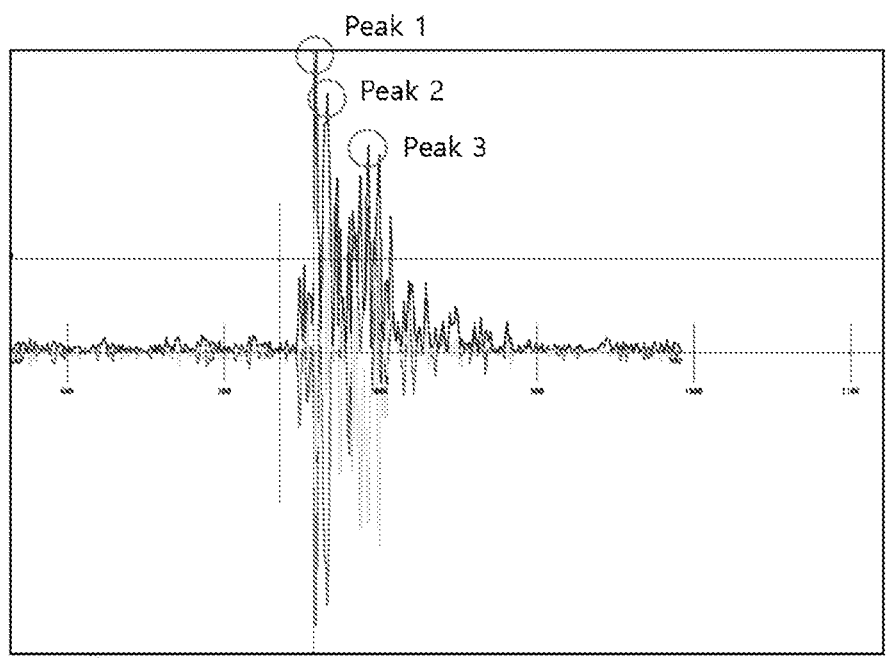
FIG. 1 is a graph showing CIR data.
Figure 2:
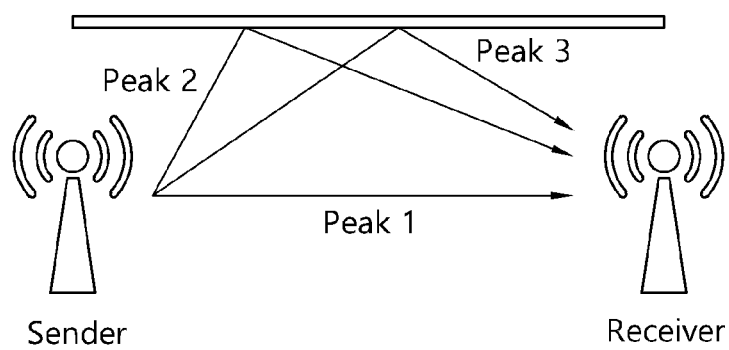
FIG. 2 is a diagram showing a propagation process of a radio signal in a wireless positioning technology.

The terms used in the specification and the claims should not be construed as being limited to general and dictionary meanings, but should be construed as being a meaning and a concept corresponding to the technical idea of the present disclosure based on the principle that the inventor can appropriately define the concept of the term in order to describe the inventor's inventive in the best way.

Therefore, the configurations described in the specification and illustrated in the drawings are merely illustrative of the most preferred embodiments of the present disclosure and do not represent all the technical ideas of the present disclosure, and thus it is to be understood that various equivalents and modifications may be substituted for the present disclosure.

Hereinafter, the embodiments of the present disclosure will be described in detail with reference to the accompanying drawings so that the present disclosure can be easily implemented by those skilled in the art to which the present disclosure pertains.

Figure 3:
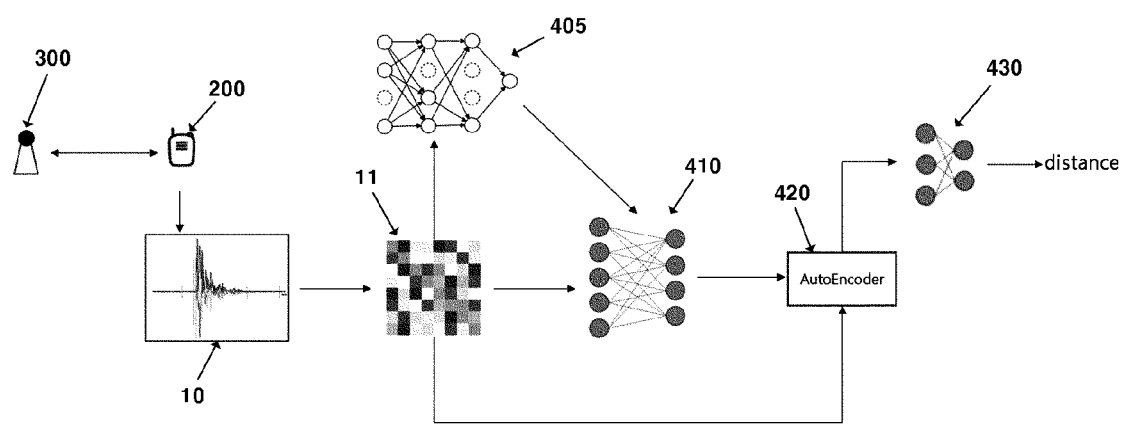
FIG. 3 is an overall configuration diagram of a system for wireless positioning according to an embodiment of the present disclosure.
Figure 4:
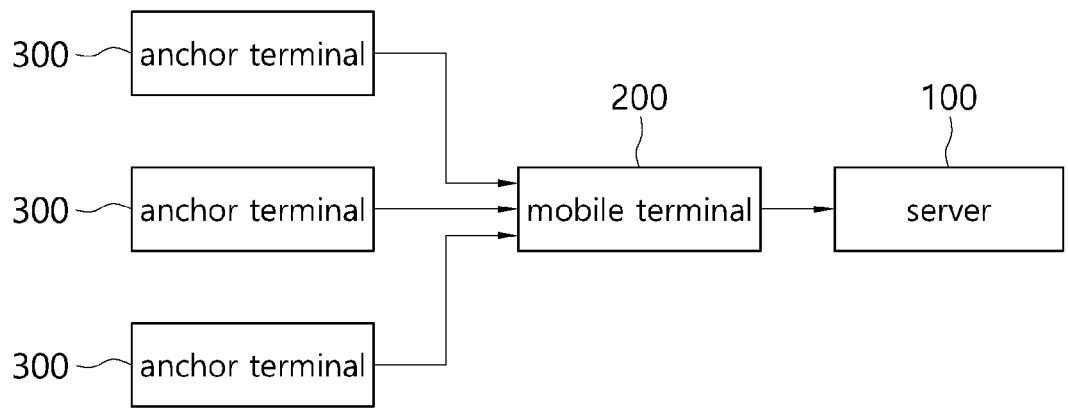
FIG. 4. is a block diagram of a system for wireless positioning according to an embodiment of the present disclosure.

FIG. 3 is an overall configuration diagram of a system for wireless positioning according to an embodiment of the present disclosure, and FIG. 4. is a block diagram of a system for wireless positioning according to an embodiment of the present disclosure.

Hereinafter, a system for wireless positioning according to an embodiment of the present disclosure will be described with reference to FIGS. 3 and 4.

The system for wireless positioning according to an embodiment of the present disclosure may include a server 100, a mobile terminal 200, and an anchor terminal 300.

A plurality of anchor terminals 300 may be fixedly installed in an indoor space in which positioning of the mobile terminal 200 is to be performed. In addition, the position (coordinate) information of the anchor terminal 300 may be preset according to the position where the anchor terminal 300 is installed, and may be transmitted to the mobile terminal 200 through wireless communication.

The mobile terminal 200 is a device that a user can carry and move, and may include a mobile phone, a smart phone, a laptop computer, a digital broadcasting terminal, a personal digital assistant (PDA), a portable multimedia player (PMP), a navigation device, and the like.

The mobile terminal 200 may include a communication unit for performing wireless communication with the server 100 and the anchor terminal 300. Such wireless communication technologies may include wireless local area network (WLAN) (Wi-Fi), wireless broadband (Wibro), world interoperability for microwave access (Wimax), high speed downlink packet access (HSDPA), general packet radio service (GPRS), CDMA, WCDMA, long term evolution (LTE), 5G and 60, but is not limited thereto.

In addition, the mobile terminal 200 may perform short-range communication with the anchor terminal 300 through a defined wireless communication protocol. As such short-range communication technologies may include ultra-wideband (UWB), ZigBee, Bluetooth, radio frequency identification (RFID), and infrared data association (IrDA), but is not limited thereto.

The mobile terminal 200 may measure a communication distance with each of the plurality of anchor terminals 300. Specifically, the mobile terminal 200 may communicate with the anchor terminal 300 and measure a communication distance between the mobile terminal 200 and the anchor terminal 300 using channel state information (CSI) of a radio signal received from the anchor terminal 300.

At this time, the channel state information (CSI) means radio channel-related data such as a channel impulse response (CIR) and a channel frequency response (CFR), and the mobile terminal 200 may select and collect channel state information (CSI) that can be easily collected for each wireless communication technology.

The position (coordinate) information of the mobile terminal 200 may be computed using the position information of the plurality of anchor terminals 300 and the communication distances between the mobile terminal 200 and each anchor terminal 300.

For example, the mobile terminal 200 may compute the position of the mobile terminal 200 using the trilateration method, but is not limited thereto.

In this case, the position of the mobile terminal 200 is not an absolute position but a relative position based on the plurality of anchor terminals 300.

Hereinafter, a method of computing a two-dimensional position coordinates x and y of the mobile terminal 200 using the trilateration method will be described, but a three-dimensional position coordinates may be computed in the same manner.

The position of the mobile terminal 200 may be represented by the two-dimensional position coordinates x and y. In the case of two-dimensional position coordinates, it is necessary to measure the positions of at least three anchor terminals 300 and the communication distance between the mobile terminal 200 and the at least three anchor terminals 300.

That is, in order to compute the two-dimensional position coordinates, an equation of three circles is required in which the positions of the three anchor terminals 300 are a center and the communication distance between the mobile terminal 200 and each three anchor terminal 300 is a radius. At this time, a point where the three circles intersect is computed as the position of the mobile terminal 200.

The mobile terminal 200 computes the equation of three circles where the current positions of the three anchor terminals 300 are the center and the communication distance between the mobile terminal 200 and each anchor terminal 300 is the radius as shown in Equation 1 below.

$$(x_1-x)^2+(y_1-y)^2=d_1$$

$$(x_2-x)^2+(y_2-y)^2=d_2$$

$$(x_3-x)^2+(y_3-y)^2=d_3 \qquad (1)$$

Here, $x_i$ and $y_i$ (where i is 1, 2, and 3) are the two-dimensional position coordinates of each anchor terminal, and $d_1$, $d_2$, and $d_3$ are the communication distances between the mobile terminal 200 and each anchor terminal 300.

As described above, when the three equations defined in Equation 1 are simultaneously solved, the two-dimensional position coordinates x and y of the mobile terminal 200 can be computed.

Of course, it is natural that the anchor terminal 300 also has a communication unit for performing a communication function and a communication distance measurement function.

Figure 5:
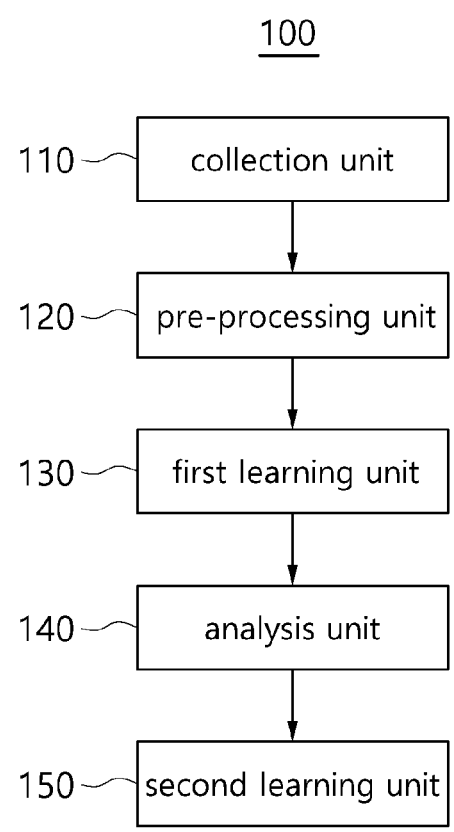
FIG. 5 is a block diagram of a server of a system for wireless positioning according to an embodiment of the present disclosure.

FIG. 5 is a block diagram of a server of a system for wireless positioning according to an embodiment of the present disclosure.

Referring to FIG. 5, the server 100 may include a collection unit 110, a pre-processing unit 120, a first learning unit 130, an analysis unit 140, and a second learning unit 150.

The collection unit 110 may collect the plurality of CIR data 10 and distance data between the anchor terminals 300 and the mobile terminal 200 by enabling the mobile terminal 200 to communicate with a plurality of anchor terminals 300 installed in a space for performing positioning of the mobile terminal.

In this case, the collection unit 110 may label the distance data to the CIR data 10.

Meanwhile, the CIR data 10 is received energy over time and is data in the form of a time series. In order for the first learning unit 130 to learn the CIR data 10, it is necessary to determine a relationship between hundreds of peaks, but there is a limitation in that it is difficult to determine a distant relationship between peaks in the CIR data 10.

Accordingly, in order to determine the distant relationship between peaks, the pre-processing unit 120 may receive the plurality of CIR data 10 labeled with the distance data and pre-process the CIR data 10 to generate the plurality of pre-processed data 11.

In this case, the plurality of pre-processed data 11 may be formed of a plurality of pixels in the form of a two-dimensional image indicating a relationship between a plurality of peaks of the CIR data 10.

The pre-processing unit 120 may generate pre-processed data 11 by pre-processing the CIR data 10 using Equations 2 to 5 below.

$$S = \{s_1, s_2, \ldots, s_n\} \quad (2)$$

$$\mu_s = \frac{\Sigma \, s_n}{n} \quad (3)$$

$$f_{i,j} = \frac{s_i - s_j}{\mu_s} \quad (4)$$

$$X = \begin{bmatrix} f_{1,1} & \cdots & f_{1,n} \\ \vdots & \ddots & \vdots \\ f_{n,1} & \cdots & f_{n,n} \end{bmatrix} \quad (5)$$

Here, S represents the CIR data 10, X represents the pre-processed data 11, and n represents the number of peaks of the CIR data 10.

In addition, $\mu_s$ means an average value of peaks of the CIR data 10, and $f_{i,j}$ means a value obtained by normalizing a difference value between peaks.

The first learning unit 130 may receive a plurality of pre-processed data 11 and distance data from the pre-processing unit 120 and train the first artificial neural network 410 based on the data.

In this case, the artificial neural network (ANN) is a statistical learning algorithm inspired by neural networks of biology (particularly, the brain in the central nervous system of animals) in machine learning and cognitive science. An artificial neural network refers to a model in which an artificial neuron that forms a network by the combination of synapses changes the binding strength of the synapse through learning and has problem-solving abilities.

The first learning unit 130 may learn all kinds of artificial neural networks, but it is preferable to select an artificial neural network suitable for an environment in which the positioning of the mobile terminal 200 is performed. For example, the first learning unit 130 may train based on a convolutional neural network (CNN).

Thereafter, when pre-processed data is input to the trained first artificial neural network 410, a distance between the plurality of anchor terminals 300 and the mobile terminal 200 may be output.

Figure 6:
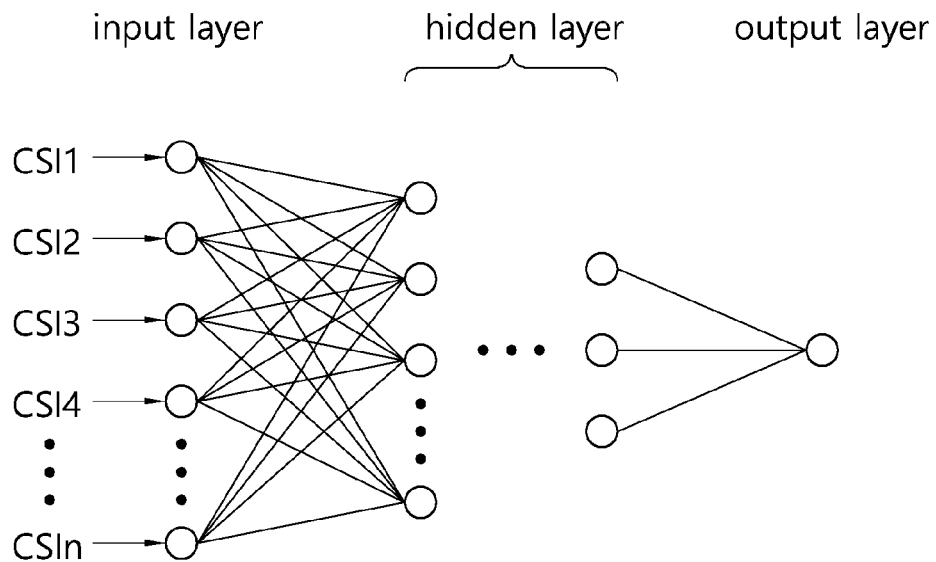
FIG. 6 is a diagram showing a structure of a first artificial neural network according to an embodiment of the present disclosure.

FIG. 6 is a diagram showing a structure of a first artificial neural network according to an embodiment of the present disclosure.

Referring to FIG. 6, the first artificial neural network 410 may include an input layer to which the plurality of channel state information CSI1 to CSIn are input, an output layer to which the distance data between the plurality of anchor terminals 300 and the mobile terminal 200 is output, and a hidden layer existing between the input layer and the output layer.

The first learning unit 130 may input the plurality of channel state information CSI1 to CSIn and the distance data between the plurality of anchor terminals 300 and the mobile terminal 200 to the input layer to train the first artificial neural network 410. Here, when the first artificial neural network 410 is trained using sufficient data until the accuracy reaches the target value, the first artificial neural network 410 with high performance and high computation may be constructed.

Although the first artificial neural network 410 has a high accuracy, it is difficult to operate in real time in the mobile terminal 200 because it requires a high level of computation.

The analysis unit 140 may analyze the first artificial neural network 410 using an explainable artificial intelligence (XAI) technology to select and extract a positioning critical data used for positioning of the mobile terminal 200 among the plurality of pre-processed data 11.

That is, the analysis unit 140 may obtain a data region mainly used when measuring the position of the mobile terminal 200 in the first artificial neural network 410 using the explainable artificial intelligence (XAI) (e.g., Local Interpretable Model-Agnostic Explanations, LIME). And, the corresponding data area may be defined as optimized positioning critical data.

The positioning critical data means data having a critical effect on the positioning of the mobile terminal 200 in an environment in which the first artificial neural network 410 is trained, and when the first artificial neural network 410 is optimized to utilize only the positioning critical data, the first artificial neural network 410 may be significantly lightweight while showing similar accuracy to the first artificial neural network 410.

Meanwhile, the data selection process is important to apply the explainable artificial intelligence technology to the first artificial neural network 410. If data causing malfunction of the neural network, such as outlier, is applied to the explainable artificial intelligence technology, the accuracy of the interpretation of the first artificial neural network 410 is deteriorated due to erroneous description.

Accordingly, the analysis unit 140 may construct a plurality of third artificial neural networks 405 having accuracy higher than or equal to a reference value compared to the first artificial neural network 410 while removing connections between any neural network nodes in the first artificial neural network 410 by using a data selection algorithm.

Then, the analysis unit 140 may input the plurality of pre-processed data to the plurality of third artificial neural networks 405, and select pre-processed data outputting the same distance data in the third artificial neural network 405 having the same number or more than the reference number among the plurality of third artificial neural networks 405 as the selection data.

The analysis unit 140 may evaluate importance of each of the plurality of pixels of the pre-processed data 11, in particular, the selection data, and select the plurality of positioning critical data consisting of a plurality of pixels having importance higher than or equal to a reference value.

For example, when the entire selection data is input to the first artificial neural network 410 and when the selection data is input to the first artificial neural network 410 after excluding a specific pixel from the selection data, the analysis unit 140 can evaluate the importance of the corresponding pixel lower as there is no difference in the output distance data.

Although not shown in the drawings, the wireless positioning system according to the embodiment of the present disclosure may further include a third learning unit.

The third learning unit may train an auto-encoder 420 based on the plurality of pre-processed data or selection data and the positioning critical data.

In this case, the trained auto-encoder 420 may output positioning critical data when the pre-processed data 11 is input. Specifically, when the pre-processed data 11 of size (n, n) is input, the auto-encoder 420 may output positioning critical data of size (m, m). For example, n may be 2036 and m may be 20.

The second learning unit 150 may train the second artificial neural network 430 based on the plurality of positioning critical data and the distance data output from the auto-encoder 420. Here, the positioning critical data may be labeled with distance data.

Since the learned second artificial neural network 430 is trained by inputting only minimal positioning critical data, the second artificial neural network 430 may be lighter than the first artificial neural network 410, and noise data may be removed, thereby exhibiting high accuracy.

Figure 7:
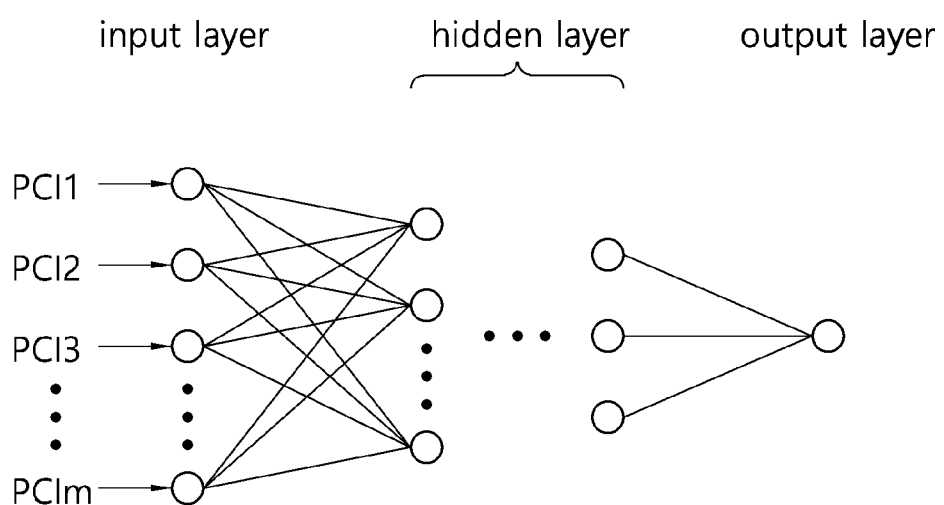
FIG. 7 is a diagram showing a structure of a second artificial neural network according to an embodiment of the present disclosure.

FIG. 7 is a diagram showing a structure of a second artificial neural network according to an embodiment of the present disclosure.

Referring to FIG. 7, the second artificial neural network 420 may include an input layer to which the positioning critical data (PCI1 to PCIm, m is an integer smaller than n), an output layer to which the distance data between the plurality of anchor terminals 300 and the mobile terminal 200 is output, and a hidden layer existing between the input layer and the output layer. Here, the number of hidden layers is smaller than that of the first artificial neural network 410.

Figure 8:
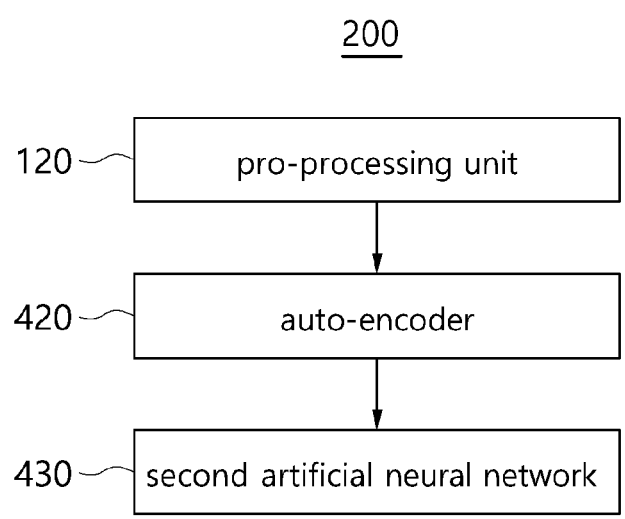
FIG. 8 is a block diagram of a mobile terminal in a system for wireless positioning according to an embodiment of the present disclosure.

FIG. 8 is a block diagram of a mobile terminal in a system for wireless positioning according to an embodiment of the present disclosure.

The mobile terminal 200 may be equipped with a pre-processing unit 120, a learned auto-encoder 420, and a second artificial neural network 420.

The mobile terminal 200 may perform positioning of the mobile terminal 200 using the equipped pre-processing unit 120, the auto-encoder 420, and the second artificial neural network 430.

Specifically, the mobile terminal 200 wirelessly communicates with the plurality of anchor terminals 300 to measure and collect the CIR data 10 used for the communication.

The mobile terminal 200 may generate the pre-processed data 11 by pre-processing the CIR data 10 through the pre-processing unit 120, output the positioning critical data by inputting the pre-processed data 11 to the auto-encoder 420, and estimate distances between the plurality of anchor terminals 300 and the mobile terminal 200 by inputting the positioning critical data to the second artificial neural network 430.

The mobile terminal 200 may perform positioning of the mobile terminal 200 using the position (coordinate) information of the plurality of anchor terminals 30 and the estimated distances between each anchor terminal 300 and the mobile terminal 200 estimated.

As described above, the wireless positioning system of the present disclosure may analyze a complex neural network using an explainable artificial intelligence technology (XAI) to extract main positioning critical data within a few tens, and may simply lighten the neural network using the extracted positioning critical data.

Accordingly, the system for wireless positioning of the present disclosure may have higher accuracy than conventional complex machine learning-based positioning technologies, and is able to perform significantly lightened positioning than conventional methods, and may rapidly and conveniently find key positioning characteristic data in a new environment.

In addition, the system for wireless positioning of the present disclosure may minimize a minimum required computing capability of a mobile terminal for positioning, thereby expecting a significant cost reduction effect.

Figure 9:
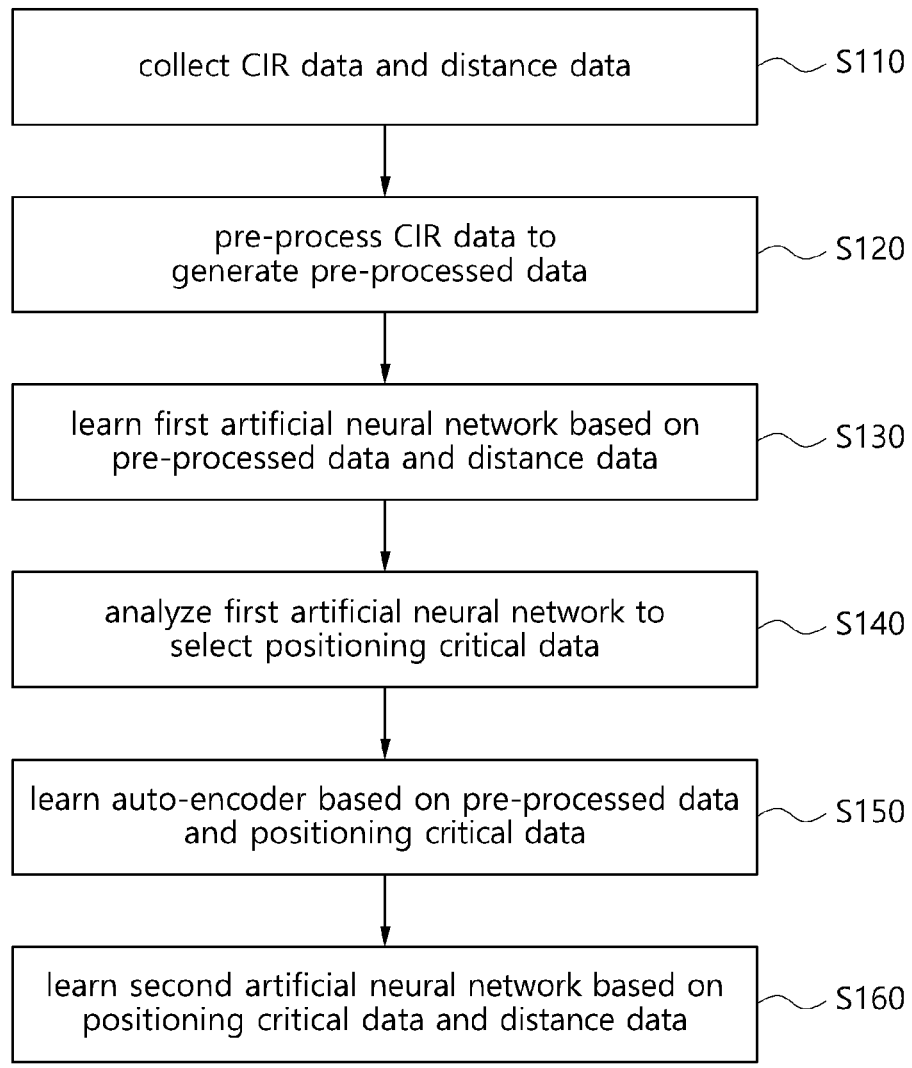
FIG. 9 is a flowchart of a method for wireless positioning according to an embodiment of the present disclosure.
Figure 10:
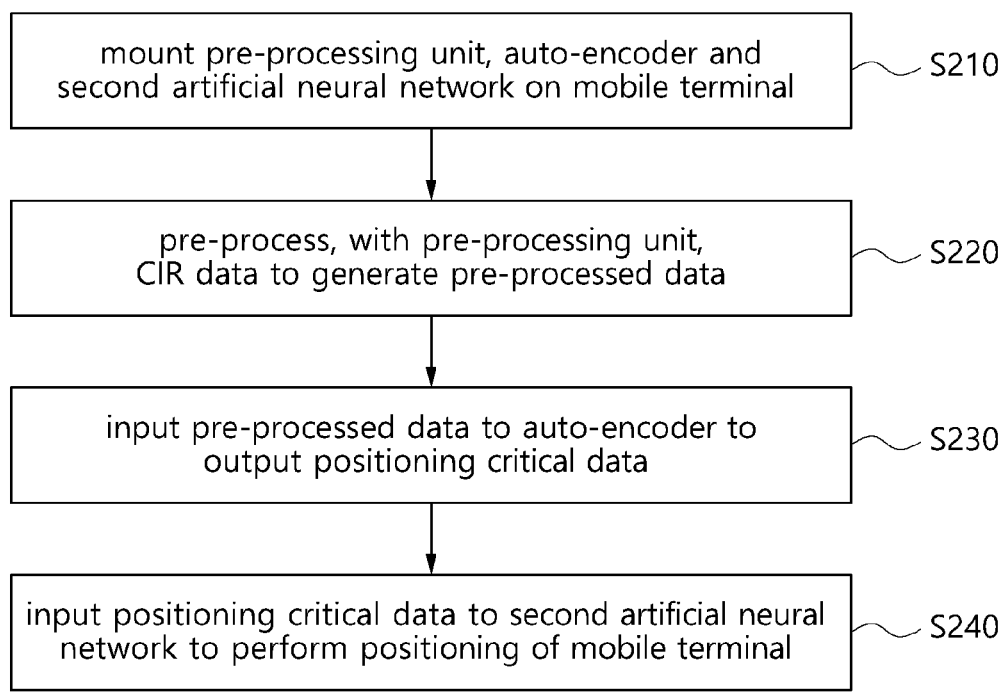
FIG. 10 is a detailed flowchart of a step of performing positioning of a mobile terminal according to an embodiment of the present disclosure.

FIG. 9 is a flowchart of a method for wireless positioning according to an embodiment of the present disclosure, and FIG. 10 is a detailed flowchart of a step of performing positioning of a mobile terminal according to an embodiment of the present disclosure.

Hereinafter, a method for wireless positioning according to an embodiment of the present disclosure will be described, but the same parts as those described above will be omitted.

First, referring to FIG. 9, a mobile terminal 200 wirelessly communicates with a plurality of anchor terminals 300 installed in a space in which positioning is to be performed, and measures a plurality of CIR data 10 and distance data between the plurality of anchor terminals 300 and the mobile terminal 200.

Next, a server 100 receives and collects the CIR data 10 measured by the mobile terminal 200 and the distance data between the plurality of anchor terminals 300 and the mobile terminal 200 (Step 110). At this time, the CIR data 10 may be labeled with distance data.

Next, the server 100 pre-processes the plurality of CIR data 10 to generate a plurality of pre-processed data 11 (Step 120).

Next, the server 100 trains the first artificial neural network 410 based on the plurality of pre-processed data 11 and the distance data (Step 130).

Next, the server 100 analyzes the first artificial neural network 420 using an explainable artificial intelligence technology (XAI) to extract and select a plurality of positioning critical data used for positioning of the mobile terminal 200 among the plurality of pre-processed data 11 (Step 140).

Next, the server 100 trains the auto-encoder 420 based on the plurality of pre-processed data 11 or selection data and the positioning critical data (Step 150). After completion of training, when the plurality of pre-processed data 11 is input to an auto-encoder 420, the positioning critical data is output.

Next, the server 100 trains a second artificial neural network based on the plurality of positioning critical data and the distance data output to the auto-encoder 420 (Step 160).

Next, referring to FIG. 10, the pre-processing unit 120, the auto-encoder 420, and the second artificial neural network 430 are mounted on the mobile terminal 200 (Step 210).

Next, the mobile terminal 200 communicates with the plurality of anchor terminals 300 to measure a CIR data 10 of a radio signal used for communication.

Next, the pre-processing unit 120 pre-processes the CIR data 10 to generate a pre-processed data 11 (Step 220).

Next, the mobile terminal 200 inputs the pre-processed data 11 to the auto-encoder 420 to output a positioning critical data (Step 230).

Next, the mobile terminal 200 inputs the positioning critical data to the second artificial neural network 430 to estimate a distance between the plurality of anchor terminals 300 and the mobile terminal 200 to perform positioning of the mobile terminal 200 (Step 240).

As described above, the method for wireless positioning of the present disclosure may analyze a complex neural network using an explainable artificial intelligence technology (XAI) to extract main positioning critical data within a few tens, and may simply lighten the neural network using the extracted positioning critical data.

Accordingly, the method for wireless positioning of the present disclosure may have higher accuracy than conventional complex machine learning-based positioning technologies, and is able to perform significantly lightened positioning than conventional methods, and may rapidly and conveniently find key positioning characteristic data in a new environment.

In addition, the method for wireless positioning of the present disclosure may minimize a minimum required computing capability of a mobile terminal for positioning, thereby expecting a significant cost reduction effect.

The wireless positioning method according to the above-described embodiment of the present disclosure may be implemented as a code that may be read by a processing unit in a medium having a program recorded thereon. Examples of media readable by such a processing unit include ROM, RAM, CD-ROM, magnetic tape, floppy disk, and optical data storage, and may be implemented in the form of a carrier wave (e.g., transmission over the Internet).

The above detailed description is illustrative of the present disclosure. The above description is merely an example of the present disclosure and is illustrative of the preferred embodiments of the present disclosure, and the present disclosure may be used in various other combinations, modifications, and environments. That is, it is possible to make changes or modifications within the scope of the concepts of the present disclosure disclosed herein, the scope of the present disclosure, the equivalent of the present disclosure, and/or the scope of technical or knowledge of the present disclosure. The above-described embodiments are provided to describe the best state of the present disclosure, and may be variously changed in the other states known in the art to use the other disclosure, and the scope of the present disclosure is needed in the specific application field and the application. The above detailed description is not intended to limit the present disclosure to the disclosed embodiments. It should be understood that the appended claims are interpreted as including other embodiments.

What is claimed is:

1. A system for wireless positioning using an explainable artificial intelligence (XAI), the system comprising
    a processor configured to:
    collect a plurality of channel impulse response (CIR) data and distance data between a plurality of anchor terminals and a mobile terminal when the mobile terminal communicates with the plurality of anchor terminals installed in a space for performing positioning of the mobile terminal;
    generate a plurality of pre-processed data by pre-processing the plurality of CIR data;
    learn a first artificial neural network based on the plurality of pre-processed data and the distance data;
    analyze the first artificial neural network to select a plurality of critical data used to estimate distance between the plurality of anchor terminals and the mobile terminal among the plurality of pre-processed data; and
    learn a second artificial neural network based on the plurality of critical data and the distance data.

2. The system of claim 1, wherein the plurality of pre-processed data consist of a plurality of pixels in the form of a two-dimensional image representing a relationship between a plurality of peaks of the plurality of CIR data.

3. The system of claim 2, wherein the processor is further configured to remove a connection between any neural network nodes in the first artificial neural network to construct a plurality of third artificial neural networks having accuracy higher than or equal to a reference value.

4. The system of claim 2, wherein the processor is further configured to evaluate importance of each of the plurality of pixels of the plurality of pre-processed data to select the plurality of critical data consisting of the plurality of pixels having an importance higher than or equal to a reference value.

5. The system of claim 4, wherein the processor is further configured to learn an auto-encoder based on the plurality of pre-processed data and the plurality of critical data.

6. The system of claim 5, wherein the auto-encoder outputs the plurality of critical data when the plurality of pre-processed data is input.

7. The system of claim 1, wherein position information of the mobile terminal is computed using position information of the anchor terminal and a communication distances between the mobile terminal and the anchor terminal.

8. The system of claim 5, wherein the mobile terminal is equipped with a pre-processor, the auto-encoder, and the second artificial neural network to perform positioning of the mobile terminal.

9. The system of claim 8, wherein the mobile terminal is configured to:
    pre-process the plurality of CIR data to generate the plurality of pre-processed data;
    input the plurality of pre-processed data to the auto-encoder to output the plurality of critical data; and
    input the plurality of critical data to the second artificial neural network to perform positioning of the mobile terminal.

10. A method for wireless positioning using an explainable artificial intelligence (XAI), comprising:
    collecting a plurality of channel impulse response (CIR) data and distance data between a plurality of anchor terminals and a mobile terminal when the mobile terminal communicates with the plurality of anchor terminals installed in a space for performing positioning of the mobile terminal;
    pre-processing the plurality of CIR data to generate a plurality of pre-processed data;
    learning a first artificial neural network based on the plurality of pre-processed data and the distance data;
    analyzing the first artificial neural network to select a plurality of critical data used to estimate distance between the plurality of anchor terminals and the mobile terminal among the plurality of pre-processed data;
    and
    learning a second artificial neural network based on the plurality of critical data and the distance data.

11. The method of claim 10, further comprising:
    learning an auto-encoder based on the plurality of pre-processed data and the plurality of critical data;
    after the learning of the second artificial neural network, generating, with the mobile terminal, the plurality of pre-processed data by pre-processing the plurality of CIR data;
    outputting, with the mobile terminal, the plurality of critical data by inputting the plurality of pre-processed data to the auto-encoder; and
    performing positioning of the mobile terminal by inputting the plurality of critical data to the second artificial neural network.

* * * * *